United States Patent Office 3,393,552
Patented July 23, 1968

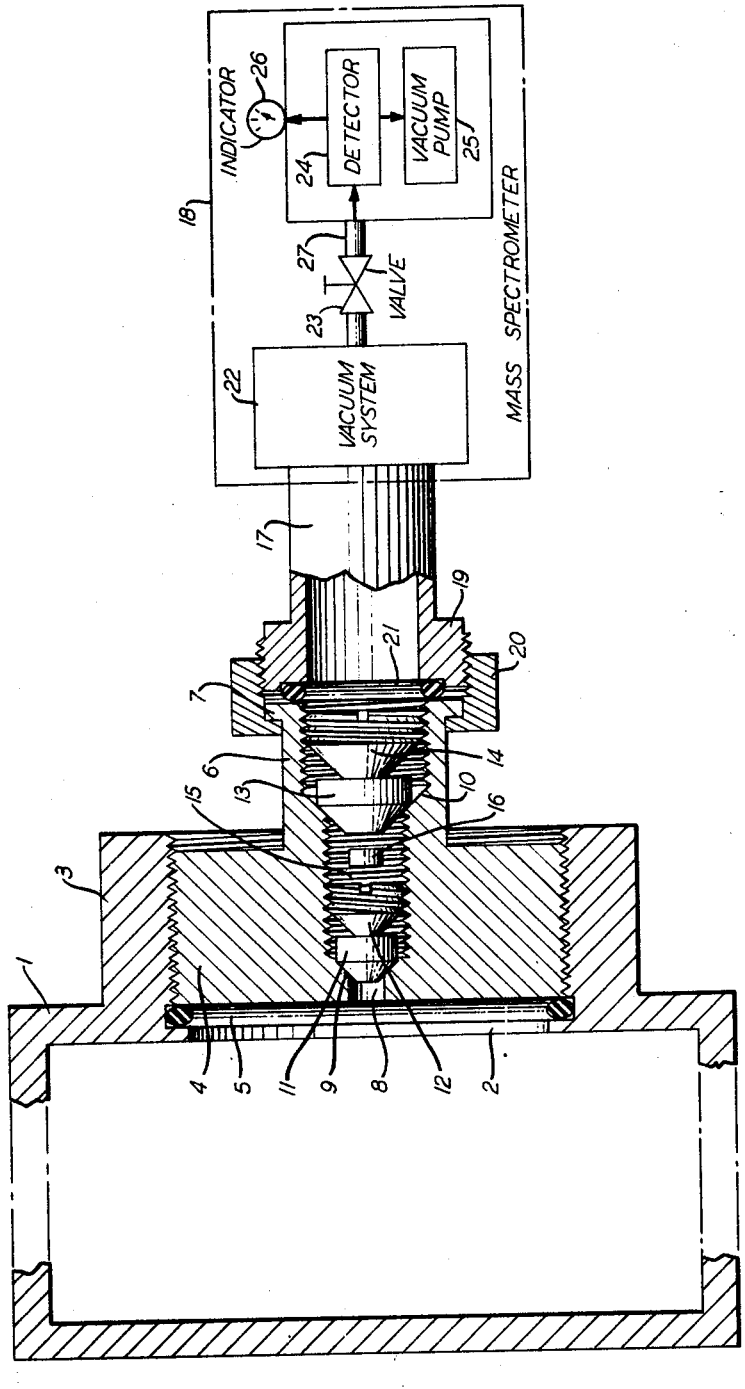

3,393,552
METHOD FOR LEAK TESTING A SEAL
Gordon H. Burgess, Winston-Salem, N.C., assignor to Bell Telephone Laboratories, Incorporated, Murray Hill, Berkeley Heights, N.J., a corporation of New York
Filed Nov. 17, 1966, Ser. No. 595,094
4 Claims. (Cl. 73—40.7)

ABSTRACT OF THE DISCLOSURE

A method of testing a seal for leakage thereof. The method comprises the steps of forming a small chamber adjoining the seal with a first side of the seal constituting one wall of the chamber, saturating a pellet of polyethylene with helium, the pellet being small in relation to the size of the chamber and adapted to slowly release the helium continuously over a period of time, placing the helium-saturated pellet in the chamber, connecting the input of a mass spectrometer to a second side of the seal, creating a vacuum against the second side of the seal, and utilizing the mass spectrometer for testing the vacuum for helium leaking therein through the seal.

---

This invention relates to a method and apparatus for testing a seal for leakage thereof and, more particularly, to detection of leakage through a seal enclosing a small space.

Heretofore, the testing of the effectiveness of a seal enclosing a space, such as the interior of a container, has been accomplished by using helium to fill the free space inside the container and then employing a conventional mass spectrometer to detect leakage of the helium through the seal. Helium is customarily used for this purpose in preference to other gases because it has a very small molecule which can quickly pass through a minute opening.

However, it has been discovered that, when high voltage electric components are mounted inside a sealed container, the presence of helium is undesirable because helium degrades the corona resistance of the electric components. In other words, helium reduces the dielectric strength of the electric components thereby lowering the point at which the electric fields surrounding them will create corona. This corona is objectionable because it weakens and, in time, destroys the insulation of the electric components. For this reason, it has been determined that, when high voltage electric components are to be sealed in a container for operation over a long period of years, their insulation can be better preserved by filling the free space inside the container with nitrogen which, since it has a large and complex molecule, actually raises the voltage point at which corona will form on the electric components. Unfortunately, although nitrogen is better than helium for preventing the formation of corona, its much larger molecule renders it considerably less effective for use in detecting small leaks.

Accordingly, it is an object of this invention to provide an improved method and apparatus for detecting leakage through a seal.

Another object of this invention is to provide an improved method and apparatus for utilizing helium in detecting leakage through a seal enclosing a small space.

These and other objects of the invention are attained by providing a double seal, comprising inner and outer seals, for a container that is to be leak tested. The two seals are spaced apart so as to form a miniature chamber between them for the purpose of containing helium therein. This chamber is tested for leakage of the helium by connecting the outer seal to the input of a conventional mass spectrometer.

However, this structure by itself is not sufficient to provide accurate results because, since the chamber is very small, it can only contain a slight amount of helium which might completely leak out through either of the seals before the mass spectrometer could be connected to the outer seal and put into operation. This would be especially liable to occur if either of the seals had a relatively large leak. Furthermore, before the mass spectrometer can be used, a vacuum system must be operated to remove air from the connecting tubes and conduits. During this suction cycle, all of the helium might be drawn out of the chamber before the mass spectrometer is switched into operation.

In either of these events, there would be no helium left for the mass spectrometer to detect. The mass spectrometer would consequently give a negative indication which would erroneously be interpreted to mean that there was no leak and, therefore, the container would be incorrectly certified as being leakproof. This is a particularly serious mistake in the case of electronic containers which are intended to be deposited on the ocean floor for continuous operation under water over a long period of years.

Such deceptive test indications are eliminated in accordance with this invention by employing a source of stored helium which slowly releases its helium continuously over a period of time. An example of a suitable source is a pellet of polyethylene which has been saturated with helium. This pellet can conveniently be placed in the small chamber that is formed between the two seals. The time required for all of the helium to escape from the pellet of polyethylene is greater than the time needed to connect the container to the mass spectrometer and to complete the initial suction cycle. Therefore, when the mass spectrometer is switched into operation, the polyethylene pellet will still be releasing helium into the small chamber. If there is a leak in the outer seal, there will now be sufficient helium available in the chamber for providing a positive indication on the mass spectrometer.

These and other features of the invention are more fully discussed in connection with the following detailed description of the drawing which is a schematic diagram, partly in section, of improved leak detecting apparatus for performing the method of this invention.

In the exemplary embodiment of this invention that is shown in the drawing, a steel container 1 is represented as having an opening 2 surrounded by a flange 3 which is threaded internally. The opening 2 is closed by means of a steel disk 4 which is externally threaded so as to engage the internally threaded flange 3. A conventional O-ring 5 is provided for assisting in the sealing of the opening 2. The disk 4 is formed with an integral extension 6 having a flange 7 at its outer end. A bore 8 is made through the center of the disk 4 and its extension 6. As is indicated in the drawing, various portions of the bore 8 have different diameters and some portions are threaded. Two sloping shoulders 9 and 10 are formed inside the bore 8 at the junctions of the different portions thereof.

The container 1 is filled with a number of high voltage electric components which have been omitted from the drawing for the purpose of simplicity. This container 1 is intended to be placed on the ocean floor and its electric components are designed for continuous operation over a long period of years. Since the container 1 is relatively inaccessible after it has been deposited on the ocean floor, every precaution should be taken beforehand to insure the reliability of the performance of its electric components. Accordingly, after the disk 4 has been installed in the opening 2 of the container 1, a vacuum pump is coupled to the bore 8 and all gaseous matter, especially water vapor, is evacuated from the container 1. Nitrogen is then forced through the bore 8 so as to fill the free space inside the container 1 for the purpose of suppressing the formation of corona on the high voltage electric components as was explained above.

The bore 8 is now doubly sealed in the following manner. A small tapered steel plug 11 is pushed into the bore 8 up to the point where its tapered end meets the shoulder 9. A small steel set screw 12 is next inserted into the bore 8 and is screwed in tightly so that its point forces the plug 11 firmly against the shoulder 9. Thus, the plug 11 serves as an inner seal for the container 1.

The outer seal is formed by placing a larger tapered steel plug 13 in the bore 8 and pushing it in so that its tapered end engages the shoulder 10. A larger steel set screw 14 is inserted in the bore 8 and is tightly screwed therein with the result that its point forces the plug 13 securely against the shoulder 10. Thus, the plug 13 forms the outer, or final, seal of the container 1 and, for this reason, its sealing effectiveness must be thoroughly tested.

It is important to note that the two sealing plugs 11 and 13 are spaced apart so as to form a miniature chamber 15 between them. Specifically, the head, or flat, side of the inner sealing plug 11 constitutes one wall of the chamber 15 while the inner tapered side of the outer sealing plug 13 constitutes another wall of the chamber 15. As was stated above, this chamber 15 is designed to contain a supply of helium for leak testing purposes.

In accordance with this invention, a source of stored helium is employed. An example of a satisfactory source is a pellet 16 of polyethylene which has been saturated with helium. In this embodiment of the invention, the size of the pellet 16 is about one-tenth of the volume of the chamber 15. Due to the small size of the pellet 16, even if all of its helium should eventually leak through the inner seal 11 into the interior of the container 1, the amount of this helium would be so small in relation to the volume of nitrogen which has been previously forced therein, that the helium would have no appreciable effect on the corona resistance of the electric components in the container 1. This polyethylene pellet 16 is placed in the chamber 15 just before the plug 13 is inserted in the bore 8. After the plug 13 and the set screw 14 have been tightened, the assembly is ready for leak testing.

Leakage detection can be conveniently accomplished by connecting the outer, or flat, side of the sealing plug 13 to the input conduit 17 of a conventional mass spectrometer 18. Since this connection should be air-tight, the conduit 17 is provided with a threaded flange 19 which is designed to engage an internally threaded collar 20 rotatably mounted on the extension 6. Thus, when the collar 20 is screwed on to the flange 19, it pulls the conduit 17 tightly against the flange 7. A conventional O-ring 21 is used for assisting in this coupling procedure.

The mass spectrometer 18 may be of any suitable design, such as that shown in the drawing wherein it is illustrated as comprising a vacuum system 22, a valve 23, a detector 24, a vacuum pump 25, and an indicator 26. When the mass spectrometer 18 is coupled to the sealing plug 13, the vacuum system 22 is operated to remove air from the front portion of the bore 8 and the conduit 17. After this suction cycle has been completed, the valve 23 is opened to connect the input of the detector 24 through a tube 27 leading to the vacuum system 22. The vacuum pump 25, which is associated with the detector 24, is operated to draw into the input of the detector 24 any gaseous matter that may be present in the conduit 17 and the front part of the bore 8. If this gaseous matter should contain any helium, the indicator 26 would be operated. Such operation of the indicator 26 would be an indication of the existence of a leak in the outer sealing plug 13.

As was explained above, if the chamber 15 did not contain the source 16 of stored helium but, instead, was simply filled with helium, all of this helium might leak out through either or both of the seals 11 and 13 before the collar 20 is completely tightened. Also, the helium might be drawn out during the initial suction cycle performed by the vacuum system 22. In either of these events, since the chamber 15 is very small, all of its helium might be exhausted before the detector 24 could be put into operation. In this case, the indicator 26 would not be actuated and this would be erroneously interpreted to signify that the seal 13 was leakproof.

Such incorrect test indications are eliminated by utilizing the source 16 of stored helium in accordance with this invention. This is because the polyethylene pellet 16 slowly releases its stored helium continuously over a period of time thereby permitting sufficient time for the initial suction cycle of the vacuum system 22 to be completed and the valve 23 to be operated for switching the detector 24 into operation. Therefore, when the detector 24 is finally operated, the polyethylene pellet 16 will still be releasing sufficient helium into the chamber 15 so that, if there is a leak in the sealing plug 13, helium will pass through the leak and into the detector 24 for causing the indicator 26 to give a positive indication of the existence of the leak.

What is claimed is:

1. A method of leak testing a seal comprising the steps of constructing a small enclosed space with said seal forming part of the enclosure thereof,
impregnating with a gas a substance which is adapted to release said gas gradually and continuously over a period of time,
placing said substance in said space for supplying said space with said gas for at least said period of time,
connecting gas-detecting means to said seal,
and utilizing said gas-detecting means for detecting said gas in the event said gas leaks through said seal.

2. A method of leak testing a seal comprising the steps of forming a small chamber adjoining said seal with a first side of the seal constituting one wall of said chamber,
saturating with helium an article which is adapted to release said helium slowly and continuously over a period of time,
placing said article in said chamber for supplying said chamber with said helium for at least said period of time,
connecting the input of a mass spectrometer to a second side of said seal,
creating a vacuum against said second side of the seal,
and utilizing said mass spectrometer for testing said vacuum for helium released from said article into said chamber and leaking through said seal into said vacuum.

3. A method of leak testing a seal in accordance with claim 2 wherein said article comprises a pellet of polyethylene.

4. A method of leak testing a seal in accordance with claim 3 wherein the size of said pellet is approximately one-tenth of the volume of said chamber.

References Cited
UNITED STATES PATENTS

| | | | |
|---|---|---|---|
| 2,819,609 | 1/1958 | Liebhafsky | 73—40.7 |
| 3,034,338 | 5/1962 | Snyder | 73—40.7 |
| 3,247,706 | 4/1966 | Rose et al. | 73—40.7 |
| 3,260,786 | 7/1966 | Katzschner. | |

DAVID SCHONBERG, *Primary Examiner.*

JEFFREY NOLTON, *Assistant Examiner.*